United States Patent Office 3,032,567
Patented May 1, 1962

3,032,567
PROCESS FOR THE PREPARATION OF 16α,17α-METHYLENE-21-HYDROXY-Δ⁴-PREGNENE-3,11,20-TRIONE AND DERIVATIVES THEREOF
Gerard Nomine, Noisy-le-Sec, Daniel Bertin, Montrouge, and Jean Jolly, Fontenay-sous-Bois, France, assignors, by mesne assignments, to Roussel-UCLAF, S.A., Paris, France, a corporation of France
No Drawing. Filed Mar. 24, 1960, Ser. No. 17,269
Claims priority, application France Mar. 27, 1959
15 Claims. (Cl. 260—397.45)

The present invention relates to a process for the production of 16α,17α-methylene derivatives of steroids of the pregnane series, to a process of preparing 16α,17α-methylene-21-hydroxy-Δ⁴-pregnene-3,11,20-trione and its lower alkanoic acid esters and to the novel compound 16α,17α-methylene-21-hydroxy-Δ⁴-pregnene-3,11,20-trione and its lower alkanoic acid esters, useful as an anti-inflammatory, as well as the novel intermediates for its production.

It is known from the work of Wettstein (Helv. Chim. Acta, 1944, 27, 1803), that steroids having an unsaturation in the 16,17-position lead, by action of diazomethane in a neutral solvent such as benzene, ether or isopropyl ether, to pyrazolines, which, by heating, furnish the corresponding 16-methylated derivatives of the structural formula:

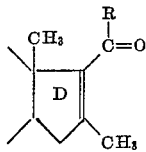

where only the D ring of the steroid is shown and R represents the radicals —CH₂OH, —CH₃ and —CH₂OAc where Ac represents the acyl radical of an organic carboxylic acid containing from one to eight carbon atoms, preferably the acetyl radical.

Thus, Oliveto et al. (J. Am. Chem. Soc., 1958, 80, 4428), starting with 3α-acetoxy-Δ¹⁶⁽¹⁷⁾-pregnene-11,20-dione, prepared the corresponding pyrazoline by action of diazomethane. The thermal decomposition of this pyrazoline leads to 3α-acetoxy-16-methyl-Δ¹⁶⁽¹⁷⁾-pregnene-11,20-dione.

From the mother liquor of these 16-methyl steroids can be isolated, as side products, in very small quantities in the neighborhood of 1 to 5% of the starting pyrazoline, the 16α,17α-methylene steroids of the general Formula I below, where only the D ring of the steroid is shown, and which are thus difficultly accessible because of these low yields:

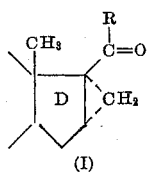

(I)

R has the meaning assigned above.

These 16α,17α-methylene derivatives of steroids of the pregnane series are useful as intermediate products in the further synthesis of steroid derivatives and especially in the synthesis of 16α,17α-methylene-21-hydroxy-Δ⁴-pregnene-3,11,20-trione and its lower alkanoic acid esters.

An object of the present invention is a process for the preparation of 16α,17α-methylene derivatives of steroids of the pregnane series starting with Δ¹⁶⁽¹⁷⁾-steroids saturated in the A, B and C rings and substituted or unsubstituted by hydroxy, acyloxy, keto or halo functions in the A, B and C rings. These compounds are useful as intermediate products in the synthesis of steroid derivatives and correspond to the general Formula I above.

Another object of the present invention is a process for the preparation of a new steroid and its esters belonging to the family of 16α,17α-methylene steroids, namely, 16α,17α-methylene-21-hydroxy-Δ⁴-pregnene-3,11,20-trione and its lower alkanoic acid esters, which possess an anti-inflammatory activity.

In addition, the invention has as its object, as novel industrial products, 16α,17α-methylene-21-hydroxy-Δ⁴-pregnene-3,11,20-trione and its lower alkanoic acid esters as well as the intermediate products of the synthesis.

These and other objects of the invention will become more apparent as the description proceeds.

According to our invention, in contrast to the prior art decomposition by thermolysis, the transformation of pyrazolines into 16α,17α-methylene steroids is accomplished with suitable yields, by the action of acids, particularly by the action of strong acids or Lewis-type acids. The reaction product obtained thereby is purified by fractional crystallization, or by treatment with the Girard reagent T with which the 16α,17α-methylene steroids do not combine and which permits the elimination of the Δ¹⁶⁽¹⁷⁾-ketosteroid starting material.

According to one mode of operation, the formation of the 16α,17α-methylene derivatives is brought about by the action of a strong acid, preferably one of the following acids: sulfuric acid, perchloric acid, acetic acid, formic acid; either at room temperature or at elevated temperatures.

According to another mode of operation, 16α,17α-methylene steroids are prepared by acidolysis of the corresponding pyrazolines with the aid of a boron halide in a ketone solvent. It is particularly advantageous in this case, to use an ethereal solution of boron trifluoride in acetone.

The reaction is illustrated by the reaction diagram of Table I below where the D ring of the steroids only is illustrated:

TABLE I

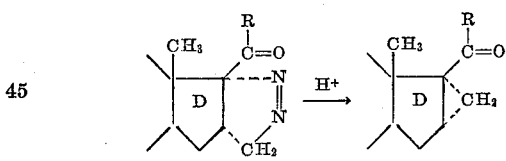

where R has the meanings assigned above.

In a particular mode of execution, 16α,17α-methylene-3α-acetoxy-pregnane-11,20-dione (II) is obtained by the action of boron trifluoride etherate on the 16(C),17(N)-pyrazoline of 3α-acetoxy-Δ¹⁶⁽¹⁷⁾-pregnene-11,20-dione dissolved in acetone, followed by vacuum filtration, washing and crystallization.

To obtain the esters of 16α,17α-methylene-21-hydroxy-Δ⁴-pregnene-3,11,20-trione (VIII) according to our process, 16α,17α-methylene-3α-acetoxy-pregnane-11,20-dione, II, the compound described above, is used as the starting material.

In order to produce 16α,17α-methylene-21-hydroxy-Δ⁴-pregnene-3,11,20-trione (VIII), Compound II is saponified to liberate the hydroxyl in the 3 position, producing 16α,17α - methylene - 3α-hydroxy-pregnane-11,20-dione (III), either by saponification or methanolysis. Two atoms of iodine are introduced according to the process described in copending, commonly-assigned United States patent application Serial No. 3,514, filed January 20, 1960, by the action of iodine in the presence of lime and calcium chloride to give 16α,17α-methylene-3α-hydroxy-21-di-iodo-pregnane-11,20-dione (IV). It was not expected that this process would also work with saturated 16α,17α-methylene steroids. By treatment of the di-iodized derivative, IV, with the alkali metal salt of a lower alkanoic acid in the presence of said acid and an inert organic solvent such as acetone or dimethylformamide, 16α,17α-methylene-3α-hydroxy-21-acyloxy-pregnane-11,20-dione (V), is obtained, where acyl represents the acyl radical derived from a lower alkanoic acid.

Compound V is oxidized by known methods so that the hydroxy function in the 3 position is converted to a ketone function and a double bond is introduced in the 4,5 position by bromination and dehydrobromination according to known processes, for example by the intermediate of a hydrazone or by the action of a base. It is well understood, and without departing from the scope of the invention, that Compound V can be oxidized and brominated simultaneously to obtain the bromoketone, VI.

Table II illustrates a flow diagram of the reaction steps above outlined.

customary procedures, leads to 16α,17α-methylene-21-hydroxy-Δ⁴-pregnene-3,11,20-trione (VIII).

The following examples illustrate the invention without, however, limiting it. The structural formulas of the novel compounds resulting from the succession of operations mentioned above are shown in Table II. It is to be understood that other 16(C),17(N)-pyrazolines of steroids of the pregnane series are utilizable in the acidolysis reaction. The melting points are instantaneous melting points determined on a Maquenne block.

EXAMPLE I

*Preparation of 16α,17α-Methylene-3α-Acetoxy-Pregnane-11,20-Dione (II) by Action of Sulfuric Acid in the Cold*

2 gm. of the 16(C),17(N)-pyrazoline of 3α-acetoxy-Δ¹⁶⁽¹⁷⁾-pregnene-11,20-dione prepared according to known procedures are dissolved in 20 cc. of concentrated sulfuric

TABLE II

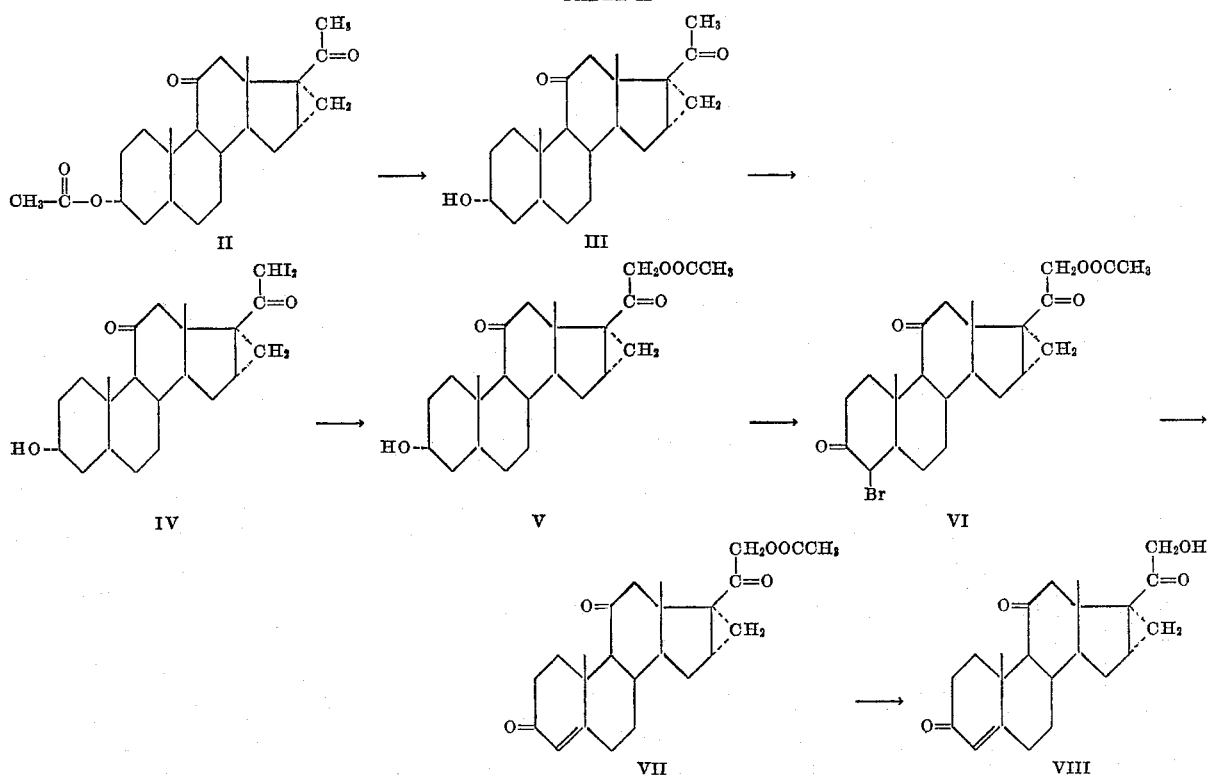

According to a preferred mode of execution, the hydroxyl group is liberated in the 3 position of 16α,17α-methylene-3α-acetoxy-pregnane-11,20-dione (II), by action of the alkalies such as alkali metal and alkaline earth methal hydroxides in an aqueous alcoholic medium such as lower alkanols and especially methanol. 16α,17α-methylene-3α-hydroxy-pregnane-11,20-dione (III) obtained thereby, is reacted with iodine in the presence of lime and calcium chloride is an anhydrous methanolic medium thus forming 16α,17α-methylene-3α-hydroxy-21-di-iodo-pregnane-11,20-dione (IV). Compound IV is subjected to the action of an alkali metal salt of a lower alkanoic acid in the presence of a catalytic amount of said acid in an inert organic solvent, preferably potassium acetate in acetone to furnish 16α,17α-methylene-3α-hydroxy-21-acetoxy-pregnane-11,20-dione (V). Compound V, treated with N-bromo-succinimide in a tertiary alcohol such as t-butanol, furnishes 16α,17α-methylene-21-acetoxy-4-bromo-pregnane-3,11,20-trione (VI) which, on dehydrobromination with a mixture of lithium carbonate and lithium bromide, leads to the desired 16α,17α-methylene-21-acetoxy-Δ⁴-pregnene-3,11,20-trione (VII). The saponification of this derivative VII, according to the acid, the temperature of the reaction mixture being 0° C. Soon after the dissolution, the evolution of nitrogen begins and lasts for ¼ hour. The mixture is poured into water and vacuum filtered. The filter cake is washed with water, dried and crystallized from isopropyl ether. Whereas the starting material readily combines with the Girard reagent T, the 16α,17α-methylene derivative does not so combine with this reagent. The product, as recrystallized from isopropyl ether (1.32 gm.) is then subjected to treatment with Girard reagent T and the "non-ketone" fraction obtained thereby with a yield of 46% of theory is purified by recrystallization in isopropyl ether and methanol. This product, 16α,17α-methylene-3α-acetoxy-pregnane-11,20-dione (II), has a melting point of 174° C. and a specific rotation of $[\alpha]_D^{20} = +175°$ (c.=1% in chloroform). It is insoluble in water and slightly soluble in the cold in methanol and isopropyl ether.

*Analysis.*—$C_{24}H_{34}O_4$; molecular weight=386.5. Calculated: C 74.57%; H, 8.87%. Found: 74.3%; H, 8.9%.

This product is not described in the literature.

EXAMPLE II

*Preparation of 16α,17α-Methylene-3α-Acetoxy-Pregnene-11,20-Dione (II) by Action of Formic Acid at Elevated Temperature*

1 gm. of the 16(C),17(N)-pyrazoline of 3α-acetoxy-$\Delta^{16(17)}$-pregnene-11,20-dione is dissolved in 10 cc. of 85% formic acid and the solution is heated to 95° C. At the end of 2 minutes, the theoretical quantity of nitrogen is evolved. The mixture is precipitated by water and vacuum filtered. The filter cake is washed with water, dried, and subjected to the treatment described in the preceding example and, after alternate recrystallizations from isopropyl ether and then methanol the desired 16α,17α-methylene compound is obtained, which is identical in all respects to the product obtained according to Example I.

EXAMPLE III

*Preparation of 16α,17α-Methylene-3α-Acetoxy-Pregnane-11,20-Dione (II) by the Action of Formic Acid in the Cold*

1 gm. of the 16(C),17(N)-pyrazoline of 3α-acetoxy-$\Delta^{16(17)}$-pregnene-11,20-dione is dissolved under mechanical agitation in 10 cc. of 85% formic acid at room temperature and the mechanical agitation is maintained for 2 hours although the evolution of nitrogen is terminated at the end of an hour. The mixture is precipitated in water and vacuum filtered, and the filter cake is dried and purified by consecutive recrystallizations from methanol and isopropyl ether. The product II has a melting point of 174° C., and is identical in all respects with the product obtained in Example I.

EXAMPLE IV

*Preparation of 16α,17α-Methylene-3α-Acetoxy-Pregnane-11,20-Dione (II) by the Action of Perchloric Acid in Acetic Acid*

Under mechanical agitation, 1 gm. of the 16(C),17(N)-pyrazoline of 3α-acetoxy-$\Delta^{16(17)}$-pregnene-11,20-dione is introduced into a mixture of 6 cc. of acetic acid and 5 cc. of a 10% solution of perchloric acid in acetic acid. The evolution of nitrogen begins immediately and is terminated at the end of 10 minutes. The mixture is precipitated in water and by recrystallization under the same conditions as previously described, the desired 16α,17α-methylene-3α-acetoxy-pregnane-11,20-dione (II) is obtained.

EXAMPLE V

*Preparation of 16α,17α-Methylene-3α-Acetoxy-Pregnane-11,20-Dione (II) by the Action of Ethereal Boron Trifluoride in Acetone*

A suspension of 20 gm. of the 16(C),17(N)-pyrazoline of 3α-acetoxy-$\Delta^{16(17)}$-pregnene-11,20-dione in 100 cc. of acetone is treated at room temperature and under agitation with 100 cc. of a 30% ethereal solution of boron trifluoride. After 30 minutes of agitation, the solution thus obtained is poured into 1 liter of iced water. The precipitate formed thereby is washed by trituration with water until the wash water is neutral, vacuum filtered and the filter cake is dried at 80° C.

The product obtained thereby is dissolved by refluxing in methanol and crystallized by cooling to −10° C. The crystalline product is vacuum filtered and washed with iced methanol. The yield is 14.2 gm. of 16α,17α-methylene-3α-acetoxy-pregnane-11,20-dione (II), that is 76% of theory, having a melting point of 175° C. and a specific rotation of $[\alpha]_D^{20} = +175°$ (c.=1% in chloroform). The product II is soluble in acetone, benzene and chloroform, soluble in hot methanol, slightly soluble in ethanol, insoluble in water and dilute aqueous acids and alkalies.

*Analysis.*—$C_{24}H_{34}O_4$; molecular weight=386.5. Calculated: C, 74.57%; H, 8.87%. Found: C, 74.3%; H, 8.9%.

EXAMPLE VI

*Preparation of 16α,17α-Methylene-21-Hydroxy-$\Delta^4$-Pregnene-3,11,20-Trione*

Stage 1—*Preparation of 16α,17α - methylene - 3α - hydroxy-pregnane-11,20-dione, III, starting with its acetate, II.*—31 gm. of 16α,17α-methylene-3α-acetoxy-pregnane-11,20-dione (II), prepared according to any of the preceding examples, are dissolved under reflux in 310 cc. of methanol, and 31 cc. of 10 N sodium hydroxide are added thereto, while continuing the reflux and maintaining it for an hour. The mixture is then diluted with about 600 cc. of hot water. Compound III begins to crystallize. The mixture is allowed to stand over night and is vacuum filtered. The filter cake is washed with water until the wash water is neutral and dried. 27 gm. of 16α,17α-methylene-3α-hydroxy-pregnane-11,20-dione (III) having a melting point of 192° C. (that is, a yield of 97.5% of theory) are obtained which can be used directly in the subsequent operations. For analysis, Compound III is purified by recrystallization from ethyl acetate. After vacuum filtering, washing with iced ethyl acetate and drying, pure Compound III, having a melting point of 194° C. and a specific rotation of $[\alpha]_D^{20} = +157.5°$ (c.=1% in chloroform) is obtained. The product is insoluble in water and dilute aqueous acids and alkalies, slightly soluble in alcohol, and soluble in chloroform.

*Analysis.*—$C_{22}H_{32}O_3$; molecular weight=344.48. Calculated: C, 76.7%; H, 9.36%. Found: C, 77.0%; H, 9.4%.

This compound is not described in the literature.

Stage 2—*Preparation of 16α,17α-methylene-3α-hydroxy-21-di-iodo-pregnane-11,20-dione (IV), starting with the pregnane, III.*—Under mechanical agitation and in a stream of nitrogen, 2 gm. of Compound III, produced by the preceding stage, are admixed with 8 cc. of absolute methanol, 1 gm. of quicklime and 2 cc. of methanol containing 10% calcium chloride. The temperature is raised to 26 to 28° C. and a solution of 2.9 gm. of iodine in a mixture of 4 cc. of pure methanol and 6 cc. of a methanolic solution of calcium chloride containing 10% calcium chloride are introduced in small fractions in proportion to the rate of absorption of the iodine. After the introduction of the iodine is terminated, the mixture is agitated again for several minutes, then cooled to about −10° C. The 21-di-iodo derivative IV crystallizes out, and is deposited at the same time as is the lime. The mixture is vacuum filtered and the filter cake is washed with iced methanol. The mixture of the 21-di-iodo derivative IV and the lime, which remains on the filter, is then introduced into a mixture of ice and water containing 15% acetic acid and is agitated for a half hour while maintaining the temperature between 0 and +5° C. The 21-di-iodo derivative IV is vacuum filtered, the filter cake is washed with water and dried in vacuo. 1.214 gm. of the desired 16α,17α-methylene-3α-hydroxy-21-di-iodo-pregnane-11,20-dione (IV) are obtained which are found to titrate at 41.2% iodine (theoretical content 42.56%).

The 21-di-iodo derivative IV is insoluble in water, and unstable in the presence of diluted acids and alkalies. It melts around 215 to 220° C. with decomposition.

This product is not described in the literature.

Stage 3—*Preparation of 16α,17α-methylene-3α-hydroxy-21-acetoxy-pregnane-11,20-dione (V), starting with the 21-di-iodo derivative IV.*—Under mechanical agitation in a stream of nitrogen, 1 gm. of Compound IV, obtained according to the preceding stage, is introduced in a mixture of 20 cc. of acetone, 0.1 cc. of acetic acid and 2 gm. of anhydrous potassium acetate and the suspension is heated to reflux without stopping the agitation. After about 10 minutes of refluxing, the reaction mixture turns reddish-orange, and then gradually becomes colorless. At the end of an hour and a half of boiling under reflux, the solution becomes almost colorless. The solution is concentrated under a vacuum produced by a water aspirator pump to ¼ of its original volume, several cubic centimeters of water are added, and the mixture is precipitated by adding under agitation to a mixture of water and ice. After standing for an hour while maintaining the temperature between 0 and $+5°$ C., the derivative V is vacuum filtered, and washed with water until the wash water is free of halides, again vacuum filtered, and the filter cake is dried. 0.6 gm. of $16\alpha,17\alpha$-methylene-$3\alpha$-hydroxy-21-acetoxy-pregnane-11,20 - dione (V) are obtained which are purified for analysis by recrystallization from ethyl acetate. After washing with ethyl acetate and drying, product V melts at 140° C. while desolvating. It then crystallizes again on the block to melt at 174° C. The product V has a specific rotation of $[\alpha]_D^{20}=+122.5°$ (c.=1% in chloroform), which corresponds to a specific rotation of $[\alpha]_D^{20}=+135°$ for the desolvated product. By drying at 135° C. it loses 9.2% of its weight of solvated ethyl acetate. Compound V can also be desolvated by agitating it for an hour in boiling water and then vacuum filtering while hot. The product is insoluble in water, and slightly soluble in ethyl acetate.

*Analysis.*—$C_{24}H_{34}O_5$; molecular weight=402.51. Calculated: C, 71.61%; H, 8.51%. Found: C, 71.6%; H, 8.4%.

*Stage 4—Preparation of $16\alpha,17\alpha$-methylene-4-bromo-21-acetoxy-pregnane-3,11,20-trione (VI) starting with the 3-hydroxylated derivative V.*—A mixture of Desolvated Compound V_____gm___ 10.6
Tertiary butyl alcohol_____cc___ 106
Water _____cc___ 2 is heated to 50° C. under agitation until completely dissolved, allowed to cool to 45° C., and then 10.3 gm. of N-bromo-succinimide are introduced. The temperature drops to 40° C. and after ten minutes of agitation at this temperature, the solution is complete. The solution is deep red and the temperature has a tendency to rise to 45° C. The solution is then heated rapidly to 60° C. while agitating and the agitation is continued for fifteen minutes after having attained this temperature. The solution then is cooled to about 30° C. and poured into iced water. Sodium bisulfite is added until the excess bromine is destroyed and the solution is vacuum filtered. The filter cake is washed with water until the wash water is neutral and free from halides, vacuum filtered again and dried. 12.4 gm., that is 99% of theory, of the raw brominated trione VI are obtained, which are purified by triturating at room temperature with a mixture of one volume of ethyl acetate and two volumes of ether. After vacuum filtering, washing with the same mixture of solvents and drying, the purified $16\alpha,17\alpha$-methylene - 4 - bromo - 21 - acetoxy - pregnane - 3,11,20-trione (VI) is obtained, having a melting point of 218° C. and a specific rotation of $[\alpha]_D^{20}=+151.5°$ (c.=1% in chloroform). The product VI is insoluble in water and ether and slightly soluble in ethyl acetate.

This compound is not described in the literature.

By treatment with zinc and acetic acid and recrystallization from acetone, it furnishes $16\alpha,17\alpha$-methylene-21-acetoxy-pregnane-3,11,20-trione, having a melting point of 190° C. and a specific rotation of $[\alpha]_D^{20}=+39°$ (c.=1% in chloroform). This product also has not been previously described and when brominated it again furnishes the brominated ketone VI.

*Analysis of this non-brominated trione.*—$C_{24}H_{32}O_5$; molecular weight=400.5. Calculated: C, 71.97%; H, 8.05%. Found: C, 72.3%; H, 8.0%.

*Stage 5—Preparation of $16\alpha,17\alpha$-methylene-21-acetoxy-$\Delta^4$-pregnene-3,11,20-trione (VII) starting with the bromoketone VI.*—5.850 gm. of the bromoketone VI, 5.850 gm. of anhydrous lithium carbonate, 2.925 gm. of anhydrous lithium bromide and 60 cc. of dimethylformamide are admixed by mechanical agitation. The temperature of this mixture is raised as rapidly as possible to reflux and the reflux is maintained for one-half hour. Thereafter, the mixture is rapidly cooled to about 50 to 60° C., and poured, while agitating, into iced water. The pregnene-trione, VII, precipitates out. The mixture is acidified to a pH of 4 to 5 by addition of acetic acid and vacuum filtered. The filter cake is washed with water until the wash water is neutral and free from halides, again vacuum filtered and dried. 4.6 gm. of the desired $16\alpha,17\alpha$-methylene-21-acetoxy-$\Delta^4$-pregnene-3,11,20-trione (VII) with a melting point of 187° C. are obtained. For analysis, the product is purified by solution in boiling acetone and concentration of the acetone solution. After icing, the crystals are vacuum filtered, and washed with iced acetone. The purified pregnene-trione VII has a melting point of 190° C., a specific rotation of $[\alpha]_D^{20}=+276°$ (c.=1% in chloroform) and an ultraviolet spectra, $\lambda_{max}=238m\mu$, $\epsilon=15\ 700$ (ethanol). The product is insoluble in water, slightly soluble in acetone and soluble in alcohol.

*Analysis.*—$C_{24}H_{30}O_5$; molecular weight=398.48. Calculated: C, 72.33%; H, 7.58%. Found: C, 72.5%; H, 7.5%.

This compound is not described in the literature.

*Stage 6—Preparation of $16\alpha,17\alpha$-methylene-21-hydroxy-$\Delta^4$-pregnene-3,11,20-trione (VIII) starting with its acetate VII.*—250 mgm. of the acetate, VII, dissolved in 2.5 cc. of chloroform, are allowed to stand with 2 cc. of methanol and 0.05 cm. of methanol containing 10% potassium hydroxide for two hours at 0° C. After neutralization the mixture is taken up with water, the solvent is driven off and the insoluble product VIII is recrystallized and separated by filtration from methanol. The desired $16\alpha,17\alpha$-methylene-21-hydroxy-$\Delta^4$-pregnene - 3,11,20 - trione (VIII) has a melting point of 247 to 248° C. and a specific rotation of $[\alpha]_D^{20}=+208°$ (c.=0.5% in chloroform). The ultraviolet spectrum shows $\lambda_{max}=237.5\ m\mu$, $\epsilon=15\ 450$ (ethanol).

*Analysis.*—$C_{22}H_{28}O_4$; molecular weight=356.44. Calculated: C, 74.13%; H, 7.92%. Found: C, 74.3%; H, 8%.

This compound is not described in the literature.

The above examples are non-limitative, and it is understood that various modifications known to those skilled in the art may be utilized without departing from the spirit of the invention. The nature of the solvents or the temperatures may be varied. In the acyloxylation step, an alkali metal salt of another lower alkanoic acid than acetic acid may be used or other equivalent techniques known to those skilled in the art may be used without departing from the scope of the appended claims.

We claim:
1. A compound selected from the group consisting of $16\alpha,17\alpha$-methylene-21-hydroxy-$\Delta^4$-pregnene - 3,11,20-trione and its lower alkanoic acid esters.
2. $16\alpha,17\alpha$-methylene-21-acetoxy-$\Delta^4$-pregnene - 3,11,20-trione.
3. $16\alpha,17\alpha$-methylene-21-hydroxy-$\Delta^4$ - pregnene - 3,11,20-trione.
4. $16\alpha,17\alpha$-methylene-21-acetoxy - pregnane - 3,11,20-trione.
5. $16\alpha,17\alpha$-methylene-$3\alpha$-hydroxy - pregnane - 11,20-dione.
6. $16\alpha,17\alpha$-methylene-$3\alpha$-hydroxy-21-acetoxy-pregnane-11,20-dione.
7. A process for the preparation of $16\alpha,17\alpha$-methylene derivatives of steroids of the pregnane series having the structural formula

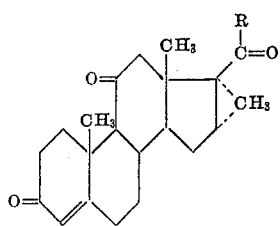

wherein R is selected from the group consisting of —CH₃, —CH₂OH and CH₂OAc, Ac is an acyl radical of a lower alkanoic acid which comprises the steps of subjecting a 16(C),17(N)-pyrazoline of $\Delta^{16(17)}$-pregnene having the formula

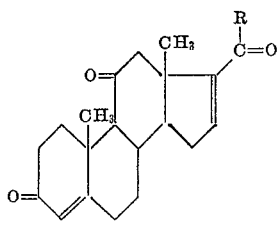

wherein R has the above definition to the action of a Lewis acid selected from the group consisting of strong inorganic and organic acids and boron trifluoride to form said 16α,17α-methylene derivatives of steroids of the pregnane series and recovering the latter compounds.

8. The process of claim 7 wherein said 16α,17α-methylene derivatives of steroids of the pregnane series are isolated by fractional crystallization.

9. The process of claim 7 wherein said 16α,17α-methylene derivatives of steroids of the pregnane series are isolated by first recrystallizing, thereafter treating with Girard reagent T, separating the non-ketone fraction and recrystallizing this fraction.

10. The process of claim 7 wherein said acid is sulfuric acid.

11. The process of claim 7 wherein said acid is formic acid.

12. The process of claim 7 wherein said acid is perchloric acid.

13. The process of claim 7 wherein said acid is acetic acid.

14. The process of claim 7 wherein said acid is a boron halide in a ketone solvent.

15. The process of producing 16α,17α-methylene-3α-acetoxy-pregnane-11,20-dione which comprises the steps of subjecting the 16(C),17(N)-pyrazoline of 3α-acetoxy-$\Delta^{16(17)}$-pregnene-11,20-dione dissolved in acetone to the action of boron trifluoride, and isolating said 16α,17α-methylene-3α-acetoxy-pregnane-11,20-dione.

References Cited in the file of this patent

Slates et al.: "Journal of American Chemical Society," 1959, vol. 81, p. 5473 relied on.